| United States Patent [19] | [11] | 4,408,009 |
|---|---|---|
| Mallon | [45] | Oct. 4, 1983 |

[54] CO-CONDENSATES OF ALKYL SILICATES AND ALKOXY SILANES

[75] Inventor: Charles B. Mallon, Belle Mead, N.J.

[73] Assignee: Union Carbide Corporation, Danbury, Conn.

[21] Appl. No.: 349,596

[22] Filed: Feb. 17, 1982

[51] Int. Cl.³ .................. C08L 83/00; C08L 83/02
[52] U.S. Cl. ............................. 524/858; 524/859
[58] Field of Search .............. 524/858, 859; 106/1, 106/17, 287.13, 287.14, 287.16

[56] References Cited

U.S. PATENT DOCUMENTS

| 2,470,562 | 5/1949 | Hyde | 528/39 |
|---|---|---|---|
| 2,698,314 | 12/1954 | Rust | 528/33 |
| 2,927,907 | 3/1960 | Polmanteer | 524/863 |
| 2,975,494 | 3/1961 | Cooper | 106/287.13 |
| 3,347,816 | 10/1967 | Krauss et al. | 524/588 |
| 4,173,490 | 11/1979 | Rotenberg et al. | 106/287.14 |
| 4,186,026 | 1/1980 | Rotenberg et al. | 106/287.14 |

*Primary Examiner*—Lewis T. Jacobs
*Attorney, Agent, or Firm*—Bernard Francis Crowe

[57] ABSTRACT

Co-condensates of alkyl silicates and alkyl or aryl trialkoxy or dialkyl or aralkyl dialkoxy silanes filled with high temperature resistant pigments form films capable of withstanding temperatures as high as 600° C.

12 Claims, No Drawings

CO-CONDENSATES OF ALKYL SILICATES AND ALKOXY SILANES

BACKGROUND OF THE INVENTION

This invention pertains to co-condensates of alkyl silicates and alkoxy silanes and more particularly to said co-condensates, highly filled with high temperature-resistant pigments.

BACKGROUND ART

The use of alkyl silicates in many typical coatings applications is prohibited by the hard, brittle nature of the hydrolysis product, $SiO_2$. Modification of an alky silicate coating to provide improved flexibility and to permit formation of continous films is a desirable goal for alkyl silicates so that their chemical resistance, abrasion resistance, and high-temperature properties can be exploited.

Only six (6) significant references were found aimed at this goal. All of them involved the co-condensation of alkyl silicates with alkyl trialkoxysilanes to produce coatings for plastic substrates (polycarbonates, especially) which exhibit superior resistance to abrasion. Two references describe systems combining alkyl silicates, alkyl trialkoxysilanes and organic polymers.

Thus, Japanese No. 79,144,500 (Chemical Abstracts: 92:147787) discloses a coating for a primed polycarbonate surface prepared by hydrolyzing $MeSi(OMe)_3$, ethyl silicate, vinyl group containing silanes, ethanol, water, and perchloric acid.

U.S. Pat. No. 4,186,206 describes abrasion resistant coatings on substrates prepared by hydrolyzing mixtures of ethyl orthosilicate, methyl trimethoxy silane and formalin.

U.S. Pat. No. 3,642,681 discloses a coating composition for polymethyl methacrylate prepared from a hydrolyzed mixture of an alkyl silicate and a silane containing ester, such as, methacryloxypropyl trimethoxysilane.

Unfortunately, none of the prior compositions exhibit resistance to elevated temperatures.

It is therefore an object of this invention to prepare hydrolyzed ethyl silicate compositions having, in addition to solvent resistance and hardness, resistance to decomposition at elevated temperatures.

Other objects will become apparent to those skilled in the art upon the further reading of the specifications.

DISCLOSURE OF THE INVENTION

It has been found that film forming coatings which are capable of surviving elevated temperatures up to about 600° C. for moderate periods of time without noticable physical change, can be obtained by admixing with co-condensates of a hydrolyzed alkyl silicate and an alkyl or aryl trialkoxy or a dialkyl or aralkyl dialkoxy silane, about 400 parts per one-hundred parts by volume of the said co-condensate of a high temperature resistant pigment or filler.

Exemplary high temperature resistant pigments or fillers include: titanium dioxide, mica, calcium carbonate, silica, as well as various inorganic pigments commonly used in high temperature applications, such as, Ferro F-6331, whose major components are iron, manganese and copper oxides. The alkyl silicates useful in this invention are known in the art comprising alkoxyalkyl silicates and alkyl silicates hydrolyzed up to about 100% by weight. The alkyl and alkoxy groups present in these silicates contain from one to about six carbon atoms. Alkyl silicates are produced by the reaction of silicon tetrachloride and alkyl alcohols and alkoxy alcohols, generally in a reactor equipped with a stirrer, condenser, and vat scrubber. The hydrogen chloride by-product is removed by reflux which may be carried out at reduced or atmospheric pressure. Through this process the most common products, tetraethyl orthosilicate (TEOS), Cellosolve ® (trademark of Union Carbide Corporation for monoalkyl ethers of ethylene glycol), silicate are made.

Subsequently these products may be hydrolyzed partially or completely by the addition of water and an acid catalyst, usually in an alcohol solvent. The amount of water added determines the degree of hydrolysis in the final product. Commercially available products derived from ethanol include, in addition to TEOS, Condensed Ethyl Silicate (about 7% hydrolysis), and Ethyl Silicate 40 (40% hydrolysis containing 40% $SiO_2$), as well as other products having an 80–85% hydrolysis level. The degree of hydrolysis relates to the stoichiometric amount of water necessary to effect hydrolysis and condensation of such silicates: $(RO)_4Si$, $RSi(OR)_3$, or $R_2Si(OR)_2$ to, respectively, $SiO_2$, $RSiO_{3/2}$ or $R_2SiO$, according to the following equations:

| | |
|---|---|
| $(RO)_4Si + 2H_2O$ | $SiO_2 + 4ROH$ |
| $RSi(OR')_3 + 3/2H_2O$ | $RSiO_{3/2} + 3R'OH$ |
| $R_2Si(OR')_2 + H_2O$ | $R_2SiO + 2R'OH$ |

Therefore, for example, a 100% hydrolyzed ethyl silicate would be prepared by reacting two molar equivalent of water with one molar equivalent of ethyl silicate.

Exemplary alkyl or aryl alkoxy silanes include the following: methyl trimethoxysilane, methyl triethoxysilane, phenyl triethoxysilane, dimethyl diethoxysilane, phenylmethyl diethoxy silane, and the like.

The invention is further described in the Examples which follow:

All parts and percentages are by weight, unless otherwise specified.

CONTROL A

As a reference coating a solution of 90% hydrolyzed ethyl silicate with a silica content of 20% was prepared by adding water (5.6 grams) containing one drop of concentrated sulfuric acid to a solution of Ethyl Silicate ES-40 (commercial grade Ethyl silicate having a degree of hydrolysis of 40%; 49 grams) in anhydrous ethanol (46 grams). The solution was allowed to stand overnight and then the solution was coated onto steel panels (about 8 mils wet (film). After air-drying for one day the resulting films were hard and were beginning to crack and flake off the substrate. Baking the coated, air-dried samples at 130° C. resulted in more severe cracking and flaking.

EXAMPLES 1–3

These examples demonstrate the beneficial effect of co-condensation of methyltriethoxy silane with ethyl silicate on film formation and also the effect of the degree of hydrolysis on film properties. Mixtures of these co-monomers were hydrolyzed to levels of 90%, 120% and 150% by adding water (14.6 grams, 19.4 grams, and 24.4 grams) containing a trace of sulfuric acid to a solution of tetraethyl ortho silicate (TEOS 50 grams, 50 grams and 50 grams) and methyltriethoxy silane (50 grams, 50 grams and 50 grams) in anhydrous ethanol (50 grams, 50 grams, and 50 grams). A small quantity of a thickener, Ethocel (5 grams), was added to each sample to aid in the preparation of the coatings. The samples were then coated onto steel panels to provide roughly one mil thick dried coatings. After standing overnight to air-dry, they were baked at 130° C. for 30 minutes and evaluated for solvent resistance (MEK double runs), falling dart direct impact, and pencil hardness. The results for the 90, 120 and 150% hydrolyzed samples were as follows: solvent resistance-30, 37 and 16 MEK double rubs direct impact-40 in./lbs., not tested (samples with hairline cracks in the films were not tested for impact resistance); pencil hardness-2H, 4H, and 5H. These results demonstrate that co-condensation of ethyl silicate with methyltriethoxy silane results in film-forming compositions whose flexibilities and impact resistances decrease and whose hardnesses increase with increasing degrees of hydrolysis.

The high temperature resistance of these materials was determined by subjecting 1 mil thick coatings on steel to a temperature of 500° C. for 30 minutes. This resulted in peeling, cracking and discoloration of all three films, demonstrating their lack of high temperature resistance.

EXAMPLES 4-6

These examples demonstrate the effect of pigmentation on film properties. They were prepared by adding $TiO_2$ (in the form of a 60% total solids dispersion in isopropanol) to the samples from examples 1, 2, and 3. The weight of $TiO_2$ added was equivalent to the theoretical weight of co-condensate in the sample (assuming complete hydrolysis to $SiO_2/MeSiO_{3/2}$). Samples were coated and dried as in Example 1 and the coating properties evaluated. The results for Examples 4, 5, and 6 were as follows: Solvent resistance-25, 9 and 5 MEK double rubs; direct impact 80 in. lbs. for all samples; pencil hardness-2H, 5H, and 3H. These results demonstrate that the addition of pigment results in reinforcement of the coating film, improving flexibility and impact resistance dramatically.

However, the high temperature resistance of these samples, evaluated as described for samples 1-3 above, is also poor. The coatings crack and peel from the substrate after 30 minutes at 500° C.

EXAMPLES 7-9

Examples 4-6 were repeated with the exception that in place of methyltriethoxy silane, three other silanes were used separately, viz., phenyltriethoxy silane, dimethyldiethoxy silane, and phenylmethyldiethoxy silane. The evaluation results of the coated substrates were essentially the same as those obtained with the methyltriethoxy silane.

Control B

A sample of 90% hydrolyzed ethyl silicate was prepared as a reference sample by adding water (9 grams) containing a trace of sulfuric acid to a solution of Ethyl Silicate ES-40 (78 grams) in anhydrous ethanol (73.1 grams). Thickener (Ethocel, 4.5 grams) was added to aid in the preparation of coatings.

To a portion of this solution (16 grams) was added a 60% dispersion of $TiO_2$ in isopropanol (50 grams) and a dispersing aid, Nuosperse 657 (0.5 grams). A 2.5 mil dry film was prepared on a three by six inch steel Q Panel.

The sample is conditioned by baking at 200° C. for 15 minutes and then placed in a muffle furnace for one hour at 510° C. The coating was cracked and peeling from the substrate after this treatment.

EXAMPLE 10

A sample of 90% hydrolyzed ethyl silicate/methyltriethoxy silane co-condensate was prepared by adding water (11 grams) containing a trace of sulfuric acid to a solution of tetraethyl orthosilicate (37.5 grams) and methyl triethoxy silane (37.5 grams) in anhydrous ethanol (75 grams). Ethocel (4.5 grams) was added to thicken the solution. To a portion (11.5 grams) of the solution was added a 60% total solids $TiO_2$ dispersion in isopropanol (40.3 grams) and a dispersing aid, Nuosperse 657 (3.5 grams). A 2 mil dry coating was prepared on a three by six inch steel Q panel and conditioned for 15 minutes at 200° C. The coated panel was then placed in a muffle furnace at 510° C. and its condition checked after 1, 2, 3, and 4 hours. At all times, the coating remained white, uncracked and adhered to the substrate. In comparison with the results contained in Control B and Examples 1-9, this demonstrates the usefulness of the highly filled co-condensate in this elevated temperature application.

EXAMPLE 11

A binder was prepared by adding water (146 g.) containing a trace of sulfuric acid (about 0.1%) to a solution of tetraethyl orthosilicate (TEOS, 500 g.) and methyltriethoxy silane (MTES, 500 g.) in anhydrous ethanol (1000 g.). Ethocel (17 g.) was also added to increase the viscosity of the solution. After standing for at least 24 hours, the following formulations were prepared and evaluated:

|  | FORMULATION | | | | | |
| --- | --- | --- | --- | --- | --- | --- |
|  | #1 | #2 | #3 | #4 | #5 | #6 |
| BINDER | 12G. | 12G. | 12G. | 12G. | 12G. | 12G. |
| $TiO_2$ (DuPont TI-PURE R-960) | 24G. | 24G. | 24G. | 24G. | 24G. | 24G. |
| ISOPROPANOL | 16G. | 16G. | 16G. | 16G. | 16G. | 16G. |
| NUOSPERSE 657 | 3G. | 1.5G. | 0.3G. | — | 1.1G. | 0.7G. |

After mixing for 30 min. with a magnetic stirrer, the formulations were coated onto steel panels to give 1-2 mil dry coatings and evaluated as follows for heat resistance:

| Conditions | 1 | 2 | 3 | 4 | 5 | 6 |
| --- | --- | --- | --- | --- | --- | --- |
| 130° C./0.5 HR. | OK | OK | OK | OK | OK | OK |
| 500° C./1 HR. | OK | OK | OK | OK | OK | OK |
| 600° C./1 HR. | OK | OK | Cracked, Flaked | Cracked, Flaked | OK | OK |

These results demonstrate that for optimum high temperature properties, the pigment and/or filler must be efficiently dispersed since Nuosperse 657 (Tenneco) is well known for its ability to disperse $TiO_2$ pigment.

EXAMPLE 12

Binder solutions were prepared as described above from the following components:

| Components | Binder 1 | 2 | 3 | 4 |
|---|---|---|---|---|
| TEOS | — | 52.5 | 39.4 | 13.1 |
| MTES | 52.5 | — | 13.1 | 39.4 |
| Anhydrous Ethanol | 52.5 | 52.5 | 52.5 | 52.5 |
| H₂O (trace H₂SO₄) | 11.9 | 13.6 | 13.2 | 12.4 |

After aging for at least one day, the following formulations were prepared and evaluated:

| Components | Formulation 1 | 2 | 3 | 4 |
|---|---|---|---|---|
| Binder 1 | 12 | — | — | — |
| Binder 2 | — | 12 | — | — |
| Binder 3 | — | — | 12 | — |
| Binder 4 | — | — | — | 12 |
| TiO₂ | 24 | 24 | 24 | 24 |
| Isopropanol | 16 | 16 | 16 | 16 |
| Nuosperse 657 | 3.5 | 3.5 | 3.5 | 3.5 |

After blending with a magnetic stirrer for 20 minutes, 1-2 mil dry coatings were prepared on steel panels and evlauated for high temperature resistance:

| Components | Formulation 1 | 2 | 3 | 4 |
|---|---|---|---|---|
| 200° C./1 Hr. | OK | Cracked | OK | OK |
| 1 hr. each at 320°, 400°, & 500° | OK | Flaking | OK | OK |
| 525° C./2 hrs. | OK | — | Cracks | OK |
| 550° C./2 hrs. | OK | — | — | OK |
| 510° C./17 hrs. | Disintegrated, only powder left | — | — | OK |

These results demonstrate the following points:
1. TEOS/MTES ratios of 3/1 to 1/3 can be used to prepare binders for high temperature coatings, but a 3/1 ratio has poorer high temperature properties than 1/3;
2. TEOS is ineffective as the sole binder component;
3. MTES is also ineffective as the sole binder component, due to its lack of long term stability at 510° C.

EXAMPLE 13

A binder was prepared as in Example 12 from TEOS (250 g.), MTES (250 g.), ethanol (500 g.), water (73 g.), sulfuric acid (trace) and Ethocel (32 g.). This binder was used to prepare the following formulations:

| Component | Formulation 1 | 2 | 3 | 4 | 5 |
|---|---|---|---|---|---|
| Binder | 12 | 12 | 12 | 12 | 12 |
| TiO₂ | 24 | 12 | 3 | 1.2 | 0.6 |
| Isopropanol | 16 | 8 | 2 | 0.8 | 0.4 |
| Nuosperse 657 | 3.5 | 1.7 | 0.5 | 0.2 | 0.1 |

Coatings 1-2 mils thick were prepared on steel panels and tested as follows:

| Conditions | Formulation 1 | 2 | 3 | 4 | 5 |
|---|---|---|---|---|---|
| 130° C./2 hrs. | — | — | — | — | — |
| 200° C./2 hrs. | OK | OK | OK | OK | OK |
| 340° C./2 hrs. | OK | OK | Cracks | Cracks | Cracks |
| 470° C./1.5 hrs. | — | — | — | — | — |
| 550° C./1.5 hrs. | OK | OK | — | — | — |

These results demonstrate the necessity of incorporating a sufficient quantity of TiO₂ (or other pigment/fillers) into the formulations in order to achieve the desired high temperature resistance of the coating.

EXAMPLE 14

Two binders were prepared as in Example 11 but from the following components:

| Components | Binder 1 | 2 |
|---|---|---|
| TEOS | 75 | — |
| Phenyltriethoxy silane (PTES) | 75 | 150 |
| Ethanol | 150 | 150 |
| H₂O (containing trace H₂SO₄) | 19.2 | 16.8 |
| Ethocel | 9.5 | 9.5 |

After aging for at least one day, the following formulations were prepared:

| Component | Formulation 1 | 2 | 3 | 4 |
|---|---|---|---|---|
| Binder 1 | 12 | 12 | — | — |
| Binder 2 | — | — | 12 | 12 |
| TiO₂ | 24 | 12 | 24 | 12 |
| Isopropanol | 16 | 8 | 16 | 8 |
| Nuosperse 657 | 3.5 | 1.7 | 3.5 | 1.7 |

Testing of 1-2 mil coatings of these formulations produced the following results:

| Conditions | | | | |
|---|---|---|---|---|
| 130° C./2 hrs. | | | | |
| 200° C./2 hrs. | OK | OK | OK | Cracks |
| 360° C./2 hrs. | OK | OK | OK | — |
| 470° C./1.5 hrs. | OK | OK | OK | — |
| 575° C./1.5 hrs. | OK | Cracks | Cracks | |

These results demonstrate the utility of PTES as a co-monomer with TEOS and also show that PTES alone is less effective than the co-condensates as binders for high temperature coatings.

EXAMPLE 15

A binder was prepared from TEOS (500 g.), MTES (500 g.), ethanol (1000 g.) and water with a trace of acid (146 g.). Ethocel (17 g.) was also added to increase viscosity. The following formulations were prepared by mixing the ingredients indicated and ball milling the mixtures overnight:

| Components | Formulation 1 | 2 |
|---|---|---|
| Binder | 377 | 156 |
| Ferro 6331 (Inorganic Iron Oxide Black Pigment) | 30 | — |
| Mica (325 Mesh) | 182 | — |
| Ethanol | 45 | — |
| TiO₂ | — | 312 |
| Isopropanol | — | 208 |
| Nuosperse 657 | 13 | 39 |

These formulations were coated onto untreated steel panels (those used in previous examples), aluminum panels and sandblasted steel panels, and evaluated as follows:

| | Steel | | Aluminum | | Sandblasted Steel | |
|---|---|---|---|---|---|---|
| Conditions | 1 | 2 | 1 | 2 | 1 | 2 |
| 135° C./1 hr. | OK | OK | OK | OK | OK | OK |
| 500° C./1 hr. | OK | OK | OK | Cracks | OK | OK |

-continued

| Conditions | Steel | | Aluminum | | Sandblasted Steel | |
|---|---|---|---|---|---|---|
| | 1 | 2 | 1 | 2 | 1 | 2 |
| 600° C./1 hr. | OK | OK | Cracks | — | OK | OK |
| 700° C./1 hr. | OK | OK | — | — | OK | OK |

Control C

As an indication of the state-of-the-art, a commercial high temperature coating was purchased (Pyromark 1200, manufactured by Tempil Division, Big Three Industries). This coating is described as useful "on metal surfaces which will be subjected to temperatures ranging as high as 1200° F./649° C." The coating was applied to sandblasted steel as recomended by the manufacturer, dried and cured according to instructions and tested as follows:

| Conditions | Pyromark 1200 |
|---|---|
| 130° C./2 hrs. | OK |
| 610° C./1 hr. | Coating intact but can be rubbed off with moderate finger pressure. |

Since this product is described as being a silicone resin based coating, the superiority of our co-condensate as a binder for high temperature coatings over a silicone binder is clearly demonstrated.

The pencil hardness and impact resistance tests are described in the ASTM Paint Testing Manual, ASTM Special Technical Publication 500 sections 5.1.2.16 and 5.1.4.4.5, respectively.

The MEK double rub tests is a measure of the solvent resistance of the coating. This is performed by rubbing a tissue, saturated with methyl ethyl ketone (MEK), back and forth across an area of the coating while applying moderate pressure. Each back-and-forth motion is counted as one MEK double rub, and the test is terminated when the coating is removed or when 100 double rubs are reached, whichever comes first.

Although the invention has been described in its preferred forms with a certain degree of particularity, it will be understood by those who are skilled in the art that the present disclosure has only been made by way of example, and that numerous changes can be made without departing from the spirit and the scope of the invention.

I claim:

1. Coating composition comprising a co-condensate of an organic orthosilicate and an alkyl or aryl trialkoxy or a dialkyl or arylalkyl dialkoxy silane in a ratio of about 3:1 to about 1:3 admixed with about 200 to about 1000 parts per 100 parts by volume of said co-condensate of a high temperature resistant pigment or filler.

2. Coating composition claimed in claim 1 wherein the co-condensate is 90% hydrolyzed.

3. Coating composition claimed in claim 1 wherein the co-condensate is 120% hydrolyzed.

4. Coating composition claimed in claim 1 wherein the co-condensate is 150% hydrolyzed.

5. Coating composition claimed in claim 1 wherein the organic orthosilicate is ethyl silicate.

6. Coating composition claimed in claim 1 wherein the alkyltrialkoxy silane is methyltriethoxy silane.

7. Coating composition claimed in claim 1 wherein the aryl trialkoxy silane is phenyltriethoxy silane.

8. Coating composition claimed in claim 1 wherein the dialkyl dialkoxy silane is dimethyl diethoxysilane.

9. Coating composition claimed in claim 1 wherein the arylalkyl dialkoxy silane is phenylmethyldiethoxy silane.

10. Coating composition claimed in claim 1 wherein the high temperature resistant pigment is titanium dioxide, $TiO_2$.

11. Coating composition claimed in claim 1 wherein the high temperature resistant pigment is mica.

12. Coating composition claimed in claim 1 wherein the high temperature resistant pigment is an inorganic pigment, whose major components are iron, manganese and copper oxides.

* * * * *